(12) United States Patent
Huang

(10) Patent No.: US 9,844,895 B1
(45) Date of Patent: Dec. 19, 2017

(54) MOULD LIFTING DEVICE SUITABLE FOR USE IN LIFTING ROTATING A MIDDLE MOULD

(71) Applicant: TIEN KANG CO., LTD., Taichung (TW)

(72) Inventor: David Huang, Taichung (TW)

(73) Assignee: Tien Kang Co., Ltd., Taichung (TW)

( * ) Notice: Subject to any disclaimer, the term of this patent is extended or adjusted under 35 U.S.C. 154(b) by 29 days.

(21) Appl. No.: 15/208,318

(22) Filed: Jul. 12, 2016

(51) Int. Cl.
| | |
|---|---|
| *B29C 45/17* | (2006.01) |
| *B29C 45/26* | (2006.01) |
| *B29C 45/66* | (2006.01) |
| *B29C 31/00* | (2006.01) |
| *B29D 35/00* | (2010.01) |

(52) U.S. Cl.
CPC ........ *B29C 31/006* (2013.01); *B29C 45/1756* (2013.01); *B29C 45/2681* (2013.01); *B29C 45/66* (2013.01); *B29D 35/0036* (2013.01)

(58) Field of Classification Search
CPC .............. B29C 31/006; B29C 45/1756; B29C 45/2681; B29C 45/66; B29D 35/0036
See application file for complete search history.

(56) References Cited

U.S. PATENT DOCUMENTS

| | | | | |
|---|---|---|---|---|
| 4,440,377 A | * | 4/1984 | Hujik | B29C 33/26 249/110 |
| 4,987,628 A | * | 1/1991 | Kim | B29C 43/04 12/1 R |
| 7,232,299 B2 | * | 6/2007 | Marc | B29C 33/0088 425/174 |
| 9,296,168 B2 | * | 3/2016 | Nguyen | B29D 35/0081 |

* cited by examiner

*Primary Examiner* — James Mackey
(74) *Attorney, Agent, or Firm* — Wang Law Firm, Inc.

(57) ABSTRACT

A mould lifting device is suitable for use in lifting and rotating a middle mould. At each of two lateral surfaces of the middle mould is provided a pivot portion. The mould lifting device includes: a platform, two longitudinal guide assemblies, two transmissions, a power assembly, two lifting members, two push members, two pivot arms, and two covers. When the pivot arms lift and rotate the middle mould, the lifted portion of the covers will not be pushed by the lifting portions of the lifting members anymore, and the covers will naturally pivot downward by gravity to make the cover portions cover the openings of the restricting grooves, which prevents the disengagement of the pivot portions of the middle mould from the restricting grooves, and thus improving the stability and security of the middle mould during the course of lifting and rotation.

9 Claims, 9 Drawing Sheets

MOULD LIFTING DEVICE SUITABLE FOR USE IN LIFTING ROTATING A MIDDLE MOULD

BACKGROUND

Field of the Invention

The present invention relates to a mould lifting device, and more particularly to a mould lifting device suitable for use in lifting and rotating a middle mould.

Related Prior Art

Mould lifting devices are one of the important equipments widely used in the industry. The conventional method of opening mould requires the use of a slide seat and a slide mould to push the upper and lower moulds. Then the upper and lower moulds which have been pushed out of the injection molding machine will be manually opened by the user using a manual mould opening device or can be automatically opened by an automatic mould opening device which is equipped with a hydraulic equipment and a sensing and controlling element.

The manual mould opening device suffers from the disadvantages: manual operation is labor intensive and likely to cause human errors, which consequently leads to production failure or even occupational injuries.

The hydraulic automatic mould opening device is free of the disadvantages mentioned above, however, the hydraulic equipment is complicated in structure, and the sensing and controlling element is expensive.

Hence, the applicant of this application invented a mould lifting structure which includes: a slide carriage, a slide mould, a mould lifting assembly, an upper mould, a lower mould, a dividing plate, a rotating device, and a pushing device which are connected to a machine. When in operation, the slide mould and the slide carriage make the upper mould, the dividing plate and the lower mould which are stacked one upon another slide out of the machine. The upper mould is lifted by the rotating device, the mould lifting assembly lifts the dividing plate, and the dividing plate is restricted by the push portion of the pushing device, so as to make the dividing plate rotate around the mould lifting assembly. Hence, the dividing plate can be lifted to prevent the dividing plate from impacting or scalding the user when the user takes down the lower mould.

As shown in FIG. 1, however, during the process of lifting or rotating the mould, the rotary shaft 111 of the dividing plate (the middle mould) only abuts between two restricting blocks 121, which may restrict the displacement of the dividing plate 11 in the left and right direction, there is no restricting structure to restrict the displacement of the dividing plate 11 (the middle mould) in the longitudinal or vertical direction. Therefore, the dividing plate 11 is likely to disengage from the mould lifting assembly 12 when it is lifted or rotated too fast.

The present invention has arisen to mitigate and/or obviate the afore-described disadvantages.

SUMMARY

The present invention is aimed at providing a mould lifting device which is capable of improving the stability and security of the middle mould during the course of the middle mould lifting and rotation.

Therefore, a mould lifting device suitable for use in lifting and rotating a middle mould, two pivot portions is provided at two lateral surfaces of the middle mould, the mould lifting device comprises:

a platform with a top surface;

two longitudinal guide assemblies disposed at two sides of the platform, and each including: a longitudinal guide unit which includes a top portion, a bottom portion located a longitudinal distance away from the top portion, and a guide portion connected between the top portion and the bottom portion, and a longitudinal slide carriage which is movably disposed on the guide portion and includes a push portion;

two transmissions for driving the longitudinal slide carriages to move;

a power assembly for driving the transmissions to move;

two lifting members disposed at both sides of the platform, and each including a lifting portion which is higher than the top surface of the platform;

two push members fixed at the top portions of the longitudinal guide assemblies, and each including a push portion located between the top portion and the bottom portion of a corresponding one of the longitudinal guide assemblies;

two pivot arms each including: a pivot connecting portion pivoted to a corresponding one of the longitudinal slide carriages, a pivot push portion which is located at one side of the pivot connecting portion to move away from or push against the push portion of a corresponding one of the push members, an abutting surface which is located at another side of the pivot connecting portion to push against or move away from a corresponding one of the push portions, and two restricting grooves which are located at another side of the pivot connecting portion and each include an opening which opens towards the top portion to restrict a corresponding one of the pivot portions of the middle mould, when the pivot push portion moves away from the push portion of the push members, the abutting surface will push against the push portion of the longitudinal slide carriages to lift the middle mould where the pivot portions are restricted in the restricting grooves, when the pivot push portion pushes against the push portion of the push members, the abutting surface will move away from the push portion of the longitudinal slide carriages to rotate the middle mould where the pivot portions are restricted in the restricting grooves;

two covers disposed on the two pivot arms, and each including: a cover portion for covering the opening of a corresponding one of the restricting grooves, and a lifted portion to be pushed by the lifting portion of a corresponding one of the lifting members, when the lifted portion is pushed by the lifting portion of a corresponding one of the lifting members, the concerned cover will pivot by an angle to move the cover portion away from the opening of the corresponding one of the restricting grooves, when the lifted portion is moved away from the lifting portion of the corresponding one of the lifting members, the concerned cover will pivot an angle to make the cover portion cover the opening of the corresponding one of the restricting grooves.

Preferably, each of the push portions is fixed on an inner surface of a corresponding one of the longitudinal slide carriages.

Preferably, each of the two transmissions includes: a first transmission wheel disposed on the top portion, a second transmission wheel disposed on the bottom portion, and a transmission belt which is wound around the first and second transmission wheels, the transmission belt includes a fixing section for fixing a corresponding one of the longitudinal slide carriages, the power assembly includes: a power connecting rod which is drivingly connected between the two second transmission wheels and includes a power connecting portion, and a power unit which is drivingly connected to the power connecting portion to drive the power connecting rod to rotate.

Preferably, the two guide portions are two parallel longitudinal guide rods.

Preferably, the power connecting portion of the power connecting rod is a toothed wheel, the power unit includes a housing, and a piston which is movably disposed in the housing and includes a toothed bar to be drivingly engaged with the power connecting portion.

Preferably, the pivot push portion of each of the pivot arms is a pulley.

Preferably, each of the restricting grooves is defined by two opposite restricting blocks fixed on each of the pivot arms.

Preferably, two restricting rods are disposed at the top portions of the longitudinal guide assemblies, and located corresponding to the covers within the scope of the pivot arms.

Preferably, each of the pivot arms includes a through hole for insertion of the lifting portion of each of the lifting members.

When the pivot arms lift and rotate the middle mould, the lifted portion of the covers will not be pushed by the lifting portions of the lifting members anymore, and the covers will naturally pivot downward by gravity to make the cover portions cover the openings of the restricting grooves, which prevents the disengagement of the pivot portions of the middle mould from the restricting grooves, and thus improving the stability and security of the middle mould during the course of lifting and rotation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
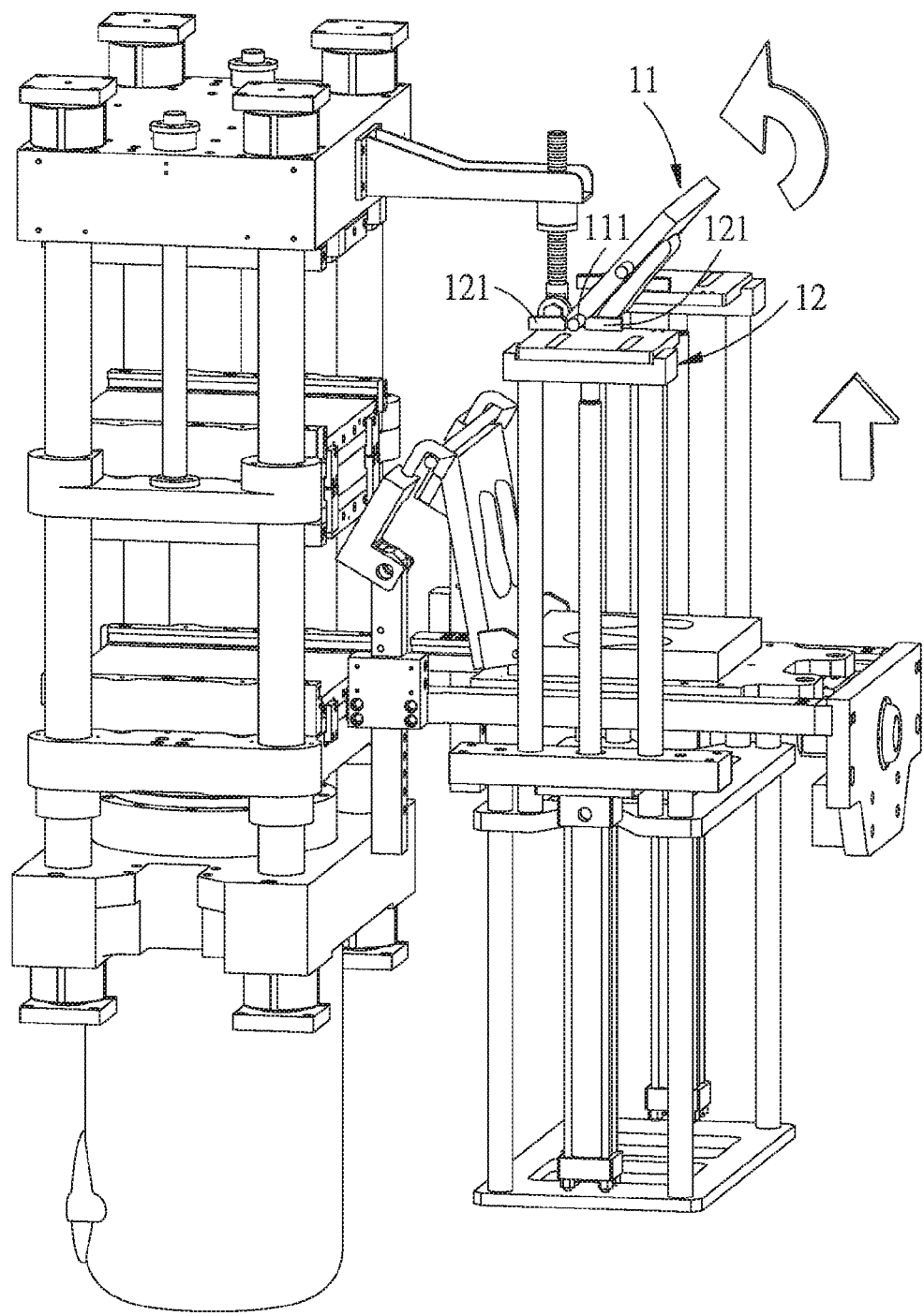
FIG. 1 is a perspective view of a conventional mould lifting structure.

The present invention will be clearer from the following description when viewed together with the accompanying drawings, which show, for purpose of illustrations only, the preferred embodiment in accordance with the present invention.

Referring to FIGS. 2-9, a mould lifting device in accordance with the preferred embodiment of the present invention is suitable for use in lifting and rotating a middle mould 90. At each of two lateral surfaces of the middle mould 90 is provided a pivot portion 91. The mould lifting device comprises: a platform 20, two longitudinal guide assemblies 30, two transmissions 40, a power assembly 50, two lifting members 61, two push members 66, two pivot arms 70, and two covers 80.

The platform 20 includes a top surface 21.

The two longitudinal guide assemblies 30 are disposed at two sides of the platform 20, and each include: a longitudinal guide unit 31 which includes a top portion 311, a bottom portion 312 located a longitudinal distance away from the top portion 311, and a guide portion 313 connected between the top portion 311 and the bottom portion 312; and a longitudinal slide carriage 32 which is movably disposed on the guide portion 313 and includes a push portion 321. In this embodiment, the two push portions 321 are located opposite to each other, and each of which is fixed on an inner surface of a corresponding one of the longitudinal slide carriages 32. The two guide portions 313 are two parallel longitudinal guide rods 314.

The two transmissions 40 each include a first transmission wheel 41 disposed on the top portion 311, a second transmission wheel 42 disposed on the bottom portion 312, and a transmission belt 43 which is wound around the first and second transmission wheels 41, 42, and includes a fixing section 431 for fixing a corresponding one of the longitudinal slide carriages 32. In this embodiment, the fixing section 431 is fixed to the corresponding one of the longitudinal slide carriages 32 by a fixing block 44, and one side of the transmission belt 43 where the fixing section 431 is located is parallel to a corresponding one of the longitudinal guide rods 314.

The power assembly 50 includes: a power connecting rod 51 which is drivingly connected between the two second transmission wheels 42 and includes a power connecting portion 511, and a power unit 52 which is drivingly connected to the power connecting portion 511 to drive the power connecting rod 51 to rotate clockwise or counterclockwise. In this embodiment, the power connecting portion 511 of the power connecting rod 51 is a toothed wheel. The power unit 52 includes a housing 521, and a piston 522 which is horizontally movable in the housing 521 and includes a toothed bar 5221 to be drivingly engaged with the power connecting portion 511. By such arrangements, the left and right motion of the piston 522 can cause clockwise and counterclockwise rotation of the power connecting rod 51, which consequently causes rotation of the second transmission wheels 42, making each of the transmission belts 43 drive the corresponding longitudinal slide carriage 32 to move between the top portion 311 and the bottom portion 312 by moving along the corresponding guide portion 313.

The two lifting members 61 are disposed at both sides of the platform 20, and each include a lifting portion 611 which is higher than the top surface 21 of the platform 20. In this embodiment, each of the lifting members 61 is located between the platform 20 and a corresponding one of the longitudinal guide assemblies 30. The two push members 66 are each disposed at the top portion 311 of a corresponding one of the longitudinal guide assemblies 30, and each include a push portion 661 located between the top portion 311 and the bottom portion 312. In this embodiment, the push portion 661 is located a distance away from a corresponding one of the guide portions 313.

Each of the two pivot arms 70 includes: a pivot connecting portion 71 pivoted to a corresponding one of the longitudinal slide carriages 32, a pivot push portion 72 which is located at one side of the pivot connecting portion 71 to move away from or push against the push portion 661 of a corresponding one of the push members 66, an abutting surface 73 which is located at another side of the pivot connecting portion 71 to push against or move away from a corresponding one of the push portions 321, and two restricting grooves 74 which are located at another side of the pivot connecting portion 71 and each include an opening 741 which opens towards the top portion 311 to restrict a corresponding one of the pivot portions 91 of the middle mould 90. When the pivot push portion 72 moves away from the push portion 661 of the push members 66, the abutting surface 73 will push against the push portion 321 of the longitudinal slide carriages 32 to lift the middle mould 90 where the pivot portions 91 are restricted in the restricting grooves 74. When the pivot push portion 72 pushes against the push portion 661 of the push members 66, the abutting surface 73 will move away from the push portion 321 of the longitudinal slide carriages 32 to rotate the middle mould 90 where the pivot portions 91 are restricted in the restricting grooves 74. In this embodiment, the pivot push portion 72 of each of the pivot arms 70 is a pulley, and each of the restricting grooves 74 is defined by two opposite restricting blocks 75 fixed on each of the pivot arms 70. Each pivot arm 70 includes a through hole 76 for insertion of the lifting portion 611 of each of the lifting members 61. The pivot push portion 72 of each of the pivot arms 70 is located a distance away from a corresponding one of the longitudinal guide rods 31 and disposed between the two longitudinal guide rods 314, and each of the restricting grooves 74 is located at another side of the corresponding longitudinal guide rods 31.

The two covers 80 are disposed on the two pivot arms 70, respectively, and each include: a cover portion 81 for covering the opening 741 of a corresponding one of the restricting grooves 74, and a lifted portion 82 to be pushed by the lifting portion 611 of a corresponding one of the lifting members 61. When the lifted portion 82 is pushed by the lifting portion 611 of a corresponding one of the lifting members 61, the concerned cover 80 will pivot by an angle to move the cover portion 81 away from the opening 741 of the corresponding one of the restricting grooves 74. When the lifted portion 82 is moved away from the lifting portion 611 of the corresponding one of the lifting members 61, the concerned cover 80 will pivot an angle to make the cover portion 81 cover the opening 741 of the corresponding one of the restricting grooves 74.

Figure 2:
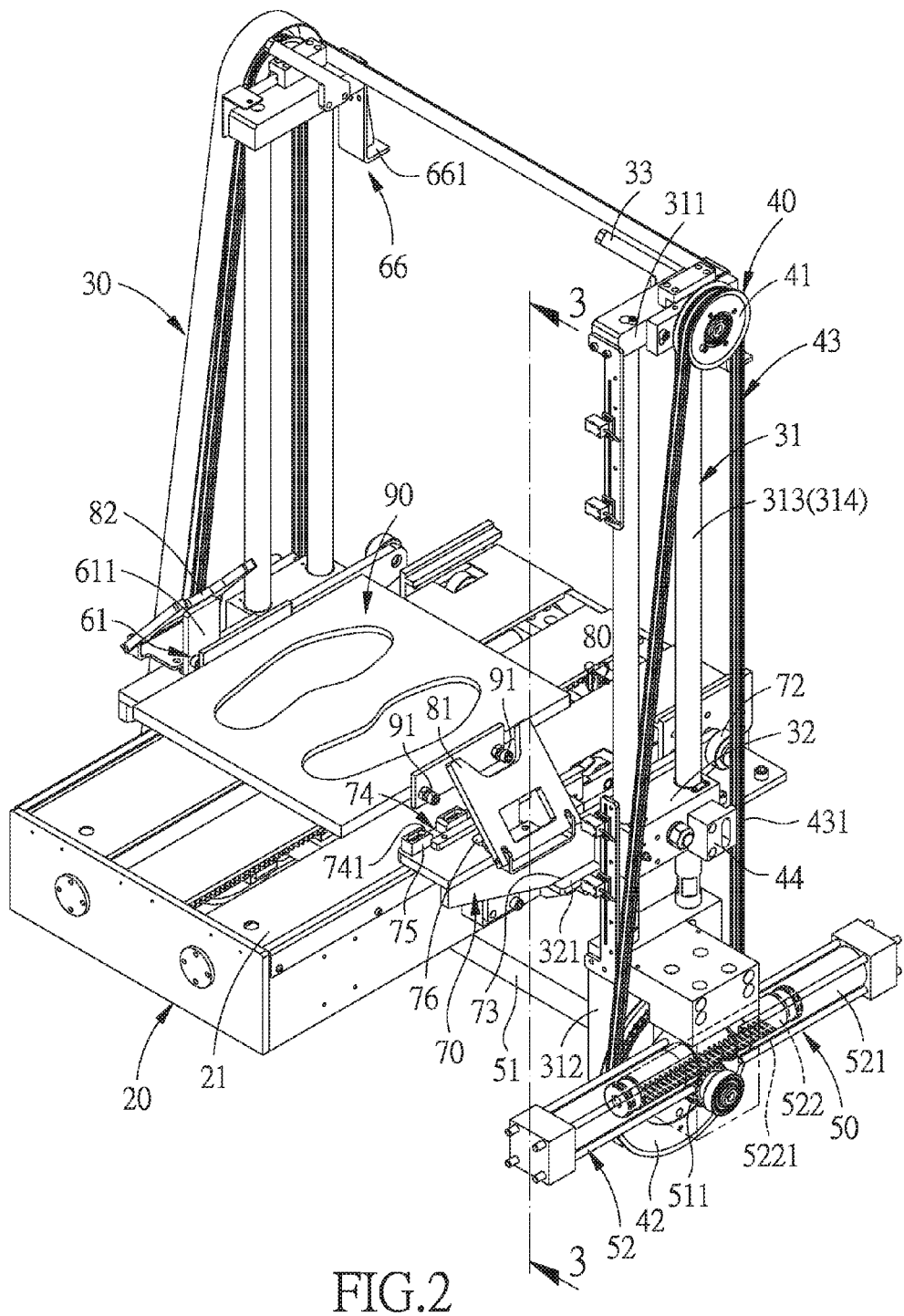
FIG. 2 is a perspective view of a mould lifting device in accordance with a preferred embodiment of the present invention is suitable for use in lifting and rotating a middle mould.
Figure 4:
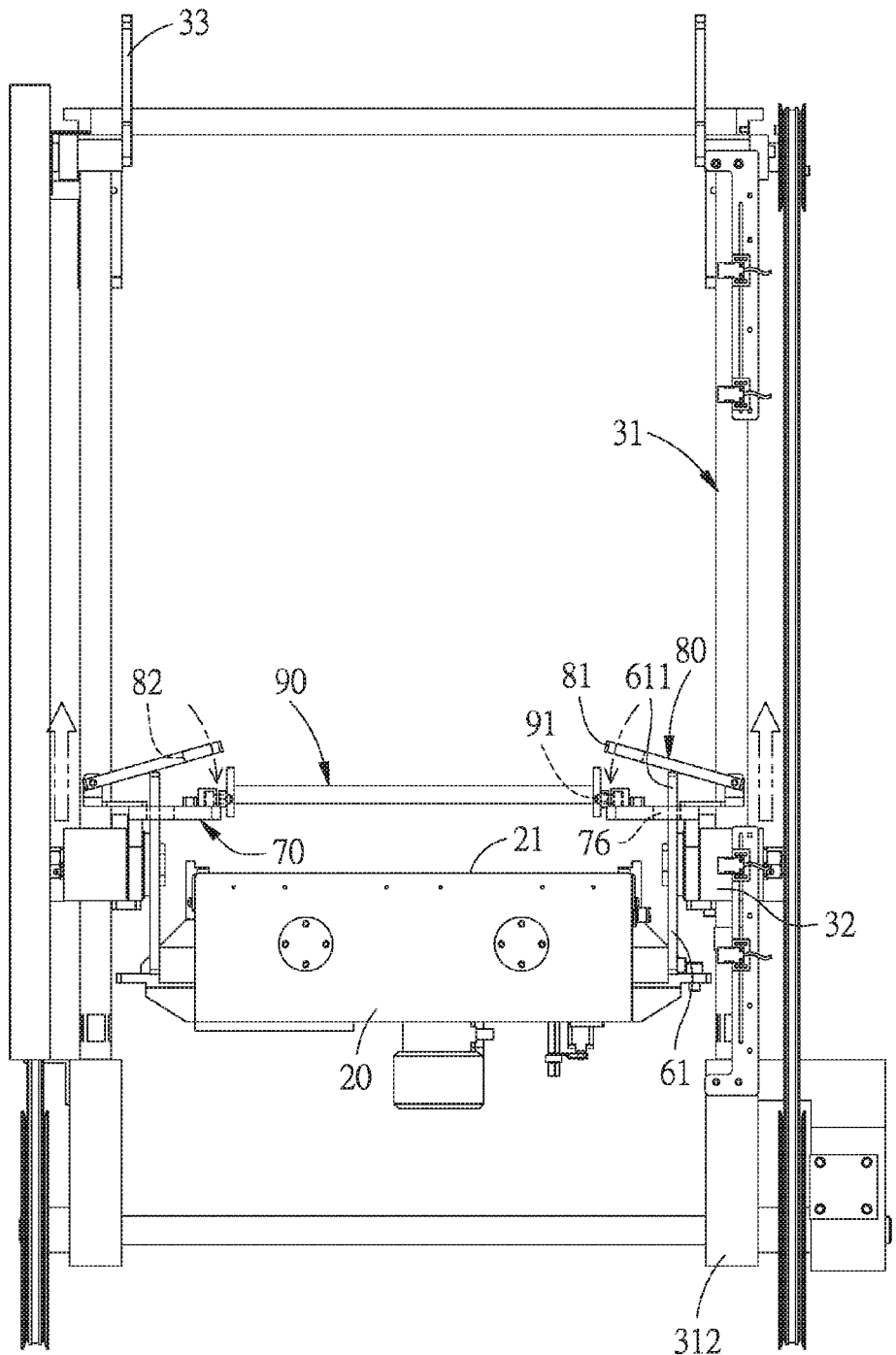
FIG. 4 is a front view of the mould lifting device in accordance with the preferred embodiment of the present invention.

Referring then to FIGS. 2 and 4, the middle mould 90 is disposed on the path along which the two longitudinal slide carriages 32 move back and forth repeatedly, and the middle mould 90 is located close to the top surface 21 of the platform 20 and the bottom portions 312 of the longitudinal guide rods 31. At this moment, the two lifting members 61 are inserted in the through holes 76 of the pivot arms 70, and the lifting portion 611 of the lifting members 61 push against the lifted portions 82 of the covers 80, so that the covers 80 will pivot by an angle to make the cover portions 81 cover the openings 741 of the restricting grooves 74.

Figure 5:
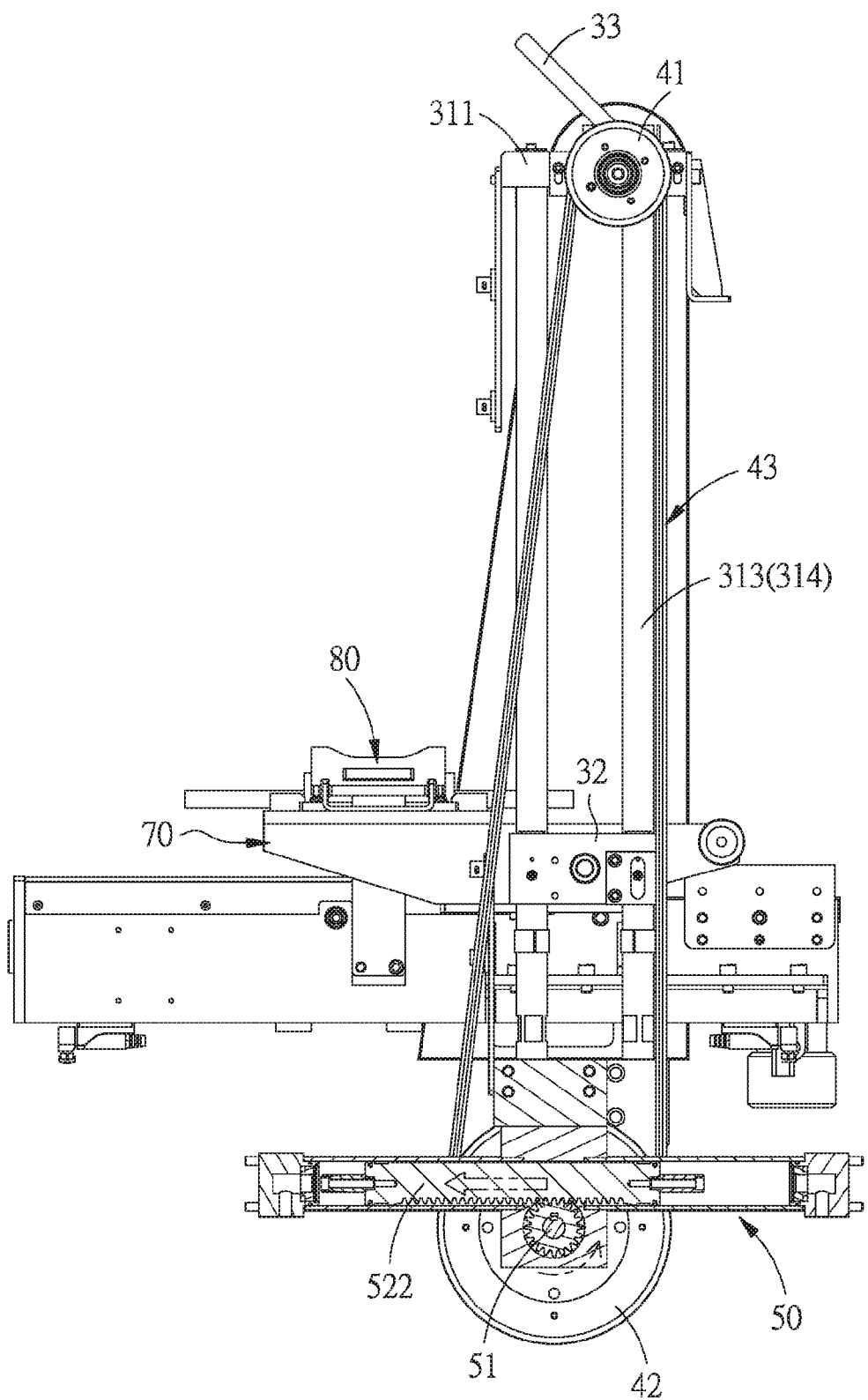
FIG. 5 is a partial cross sectional view showing the operation of the power unit of the mould lifting device in accordance with the preferred embodiment of the present invention.
Figure 6:
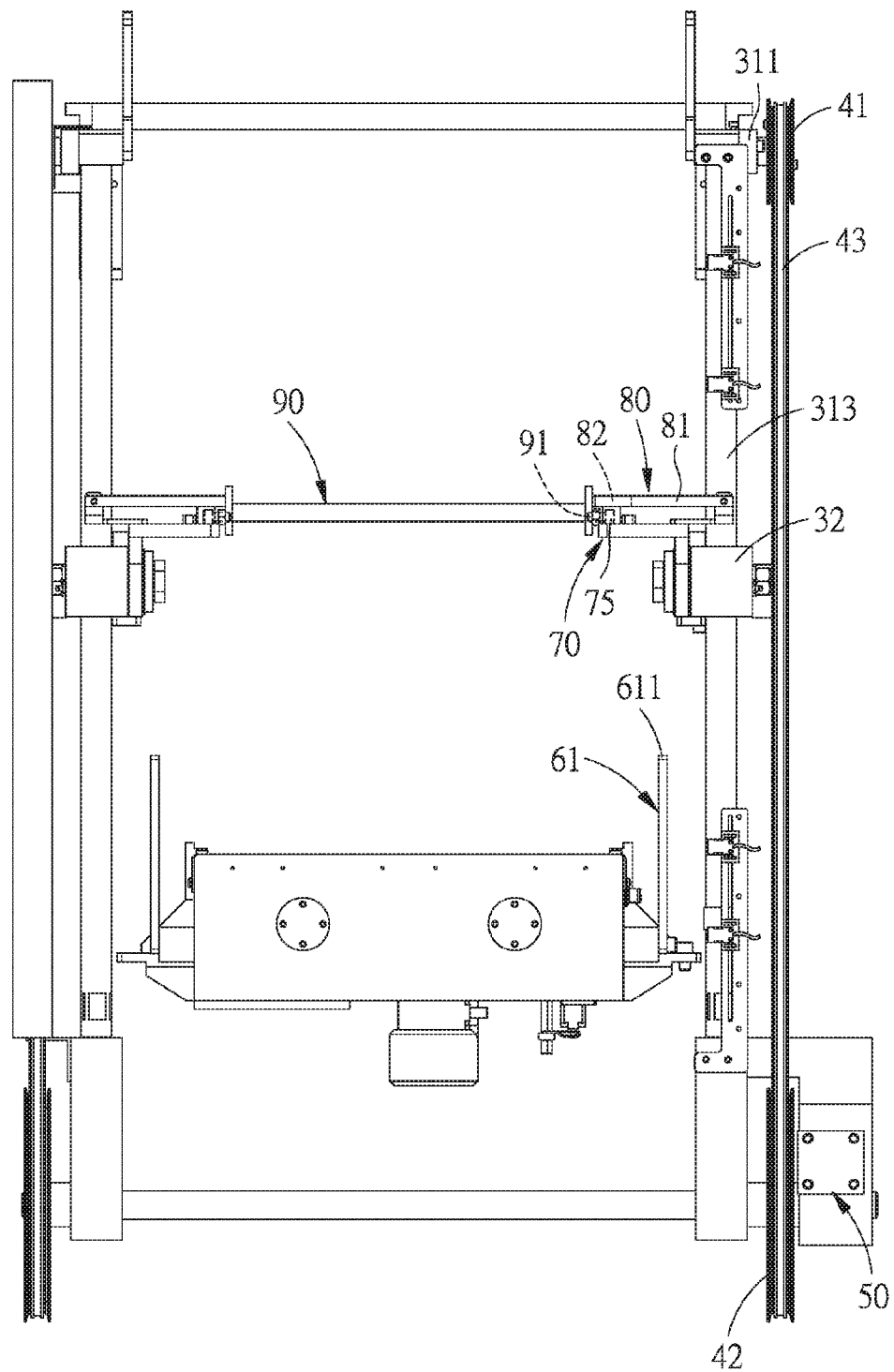
FIG. 6 is a front view showing that the slide carriages move upward while carrying the middle mould.
Figure 7:
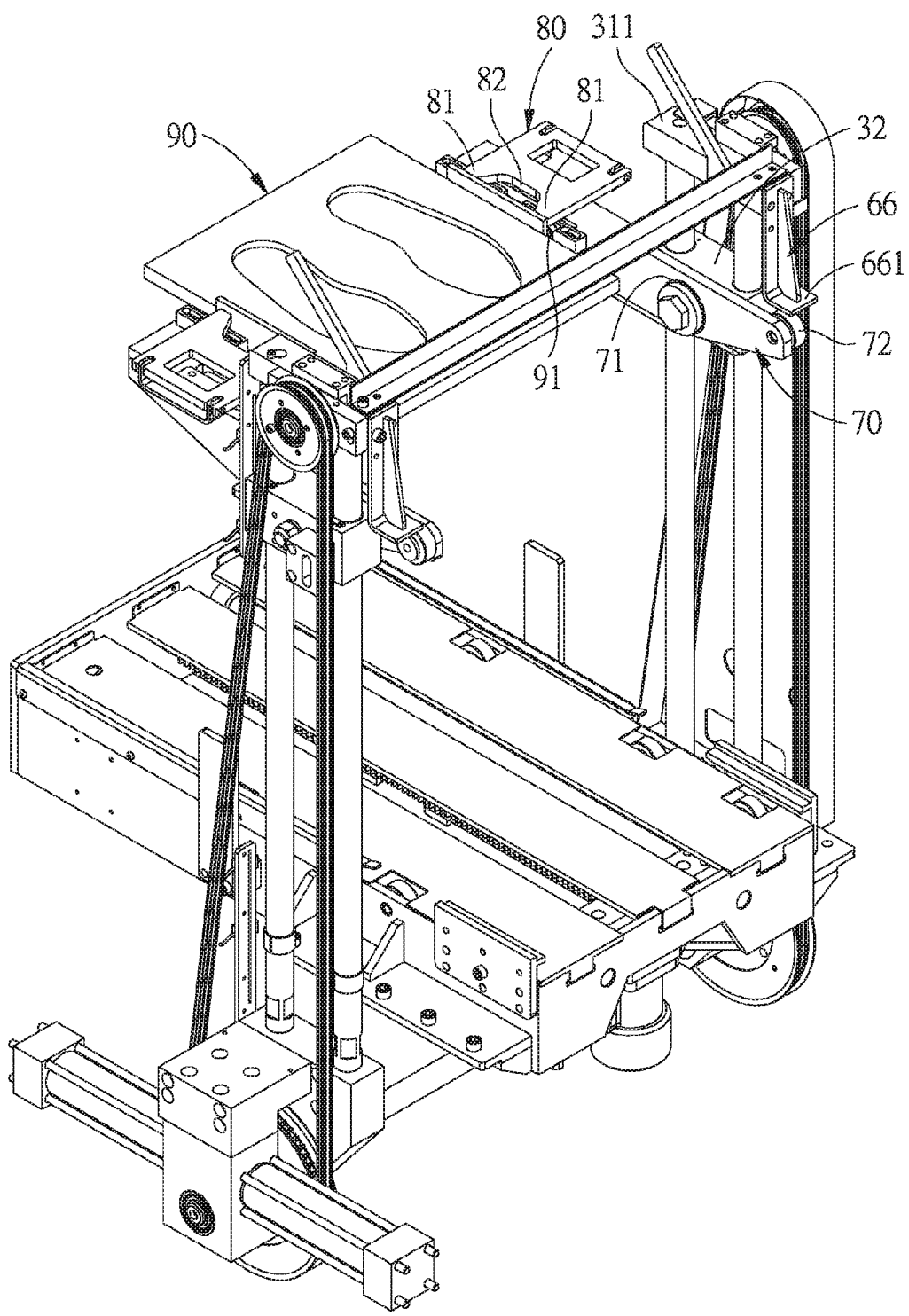
FIG. 7 is an operational view of the present invention showing that the pivot push portions of the pivot arms push against the push members.

Referring then to FIGS. 4-6, the piston 522 of the power assembly 50 then moves from right to the left to cause reverse rotation of the power connecting rod 51 and the first and second transmission wheels 41, 42, as a result, the transmission belts 43 drive the longitudinal slide carriages 32 to move along the guide portions 313 towards the top portions 311. At this moment, the pivot arms 70 pivoted to the longitudinal slide carriages 32 and the covers pivoted to the pivot arms 70 will also move simultaneously toward the top portions 311.

Referring then to FIGS. 2 and 6, when the longitudinal slide carriages 32 moved towards the top portions 311 by a distance, the pivot portions 91 of the middle mould 90 will be restricted in the restricting grooves 74 of the pivot arms 70, which makes the middle mould 90 moves along with the upward displacement of the pivot arms 70. Meanwhile, the lifting portions 611 of the lifting members 61 will move away from the lifted portions 82 of the covers 80, so that the covers 80 will pivot by gravity an angle to make the cover portion 81 cover the opening 741 of the corresponding one of the restricting grooves 74, which reduces the chance of the pivot portions 91 of the middle mould 90 disengaging from the restricting grooves 74.

Referring then to FIGS. 6-9, when the longitudinal slide carriages 32 keep moving towards the top portions 311, the pivot connecting portions 71 of the pivot arms 70 push against the push portion 661 of the push members 66, and the pivot arms 70 pivot reversely about the pivot connecting portions 71 by an angle, the abutting surfaces 73 of the pivot arms 70 will disengage from the push portions 321 of the longitudinal slide carriages 32 to rotate the middle mould 90 by an angle, and at that moment, the pivot portions 91 are restricted in the restricting grooves 74.

When the pivot arms 70 lift and rotate the middle mould 90, the lifted portion 82 of the covers will not be pushed by the lifting portions 611 of the lifting members 61 anymore, and the covers 80 will naturally pivot downward by gravity to make the cover portions 81 cover the openings 741 of the restricting grooves 74, which prevents the disengagement of the pivot portions 91 of the middle mould 90 from the restricting grooves 74, and thus improving the stability and security of the middle mould 90 during the course of lifting and rotation.

Figure 3:
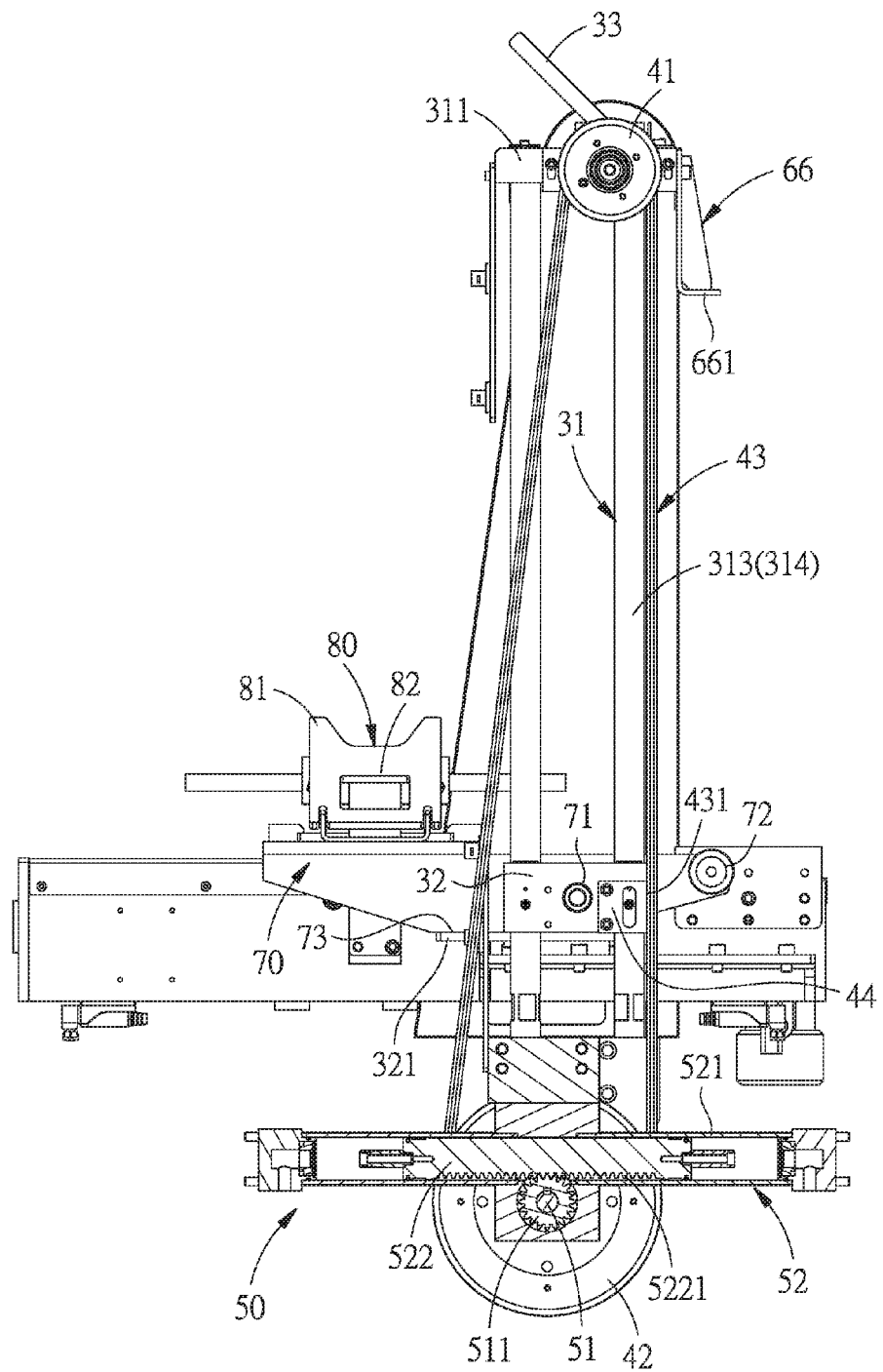
FIG. 3 is a cross sectional view taken along the line 3-3 of FIG. 2.
Figure 8:
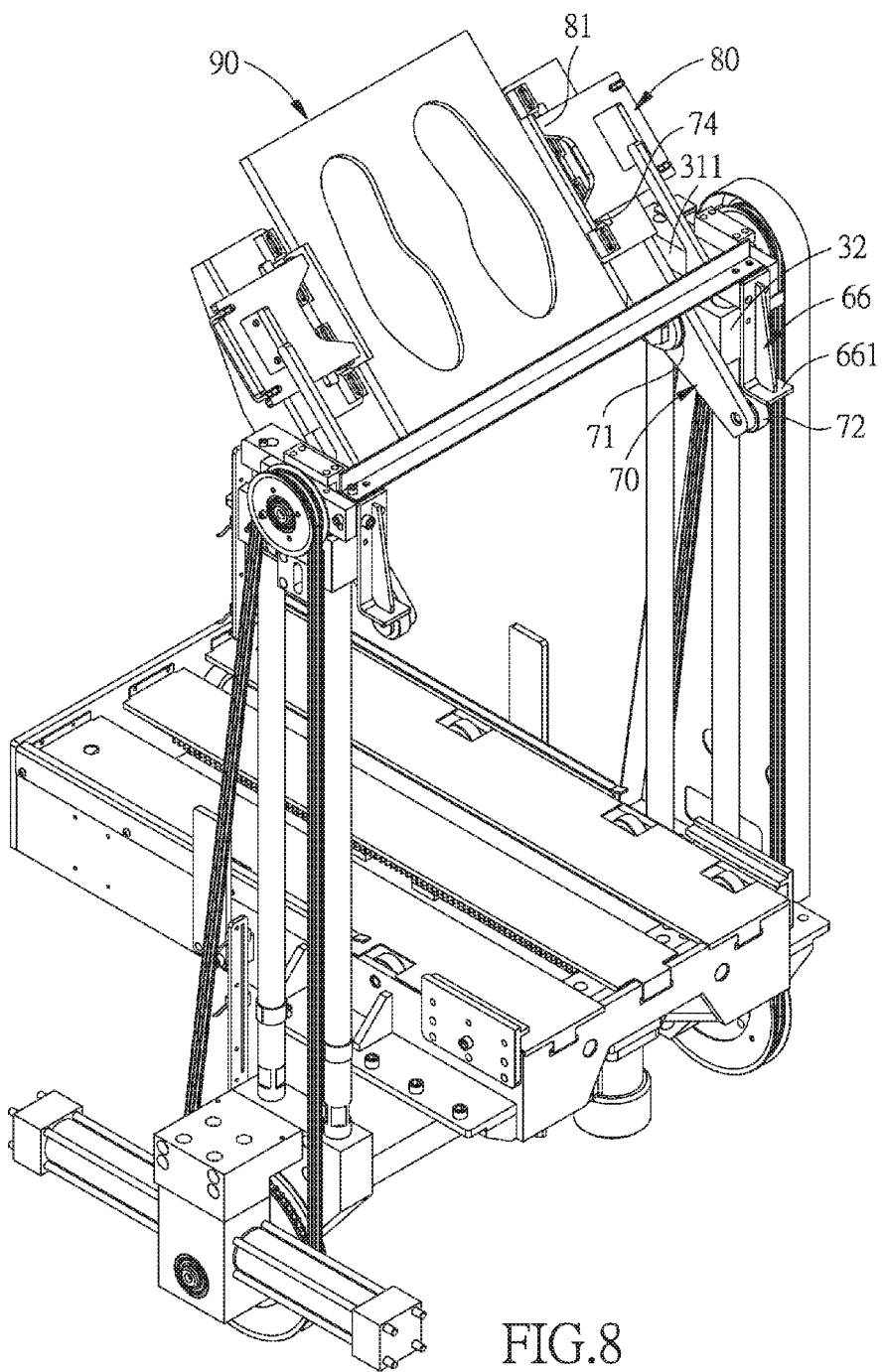
FIG. 8 is an operational view of the present invention showing the rotation of the middle mould.
Figure 9:
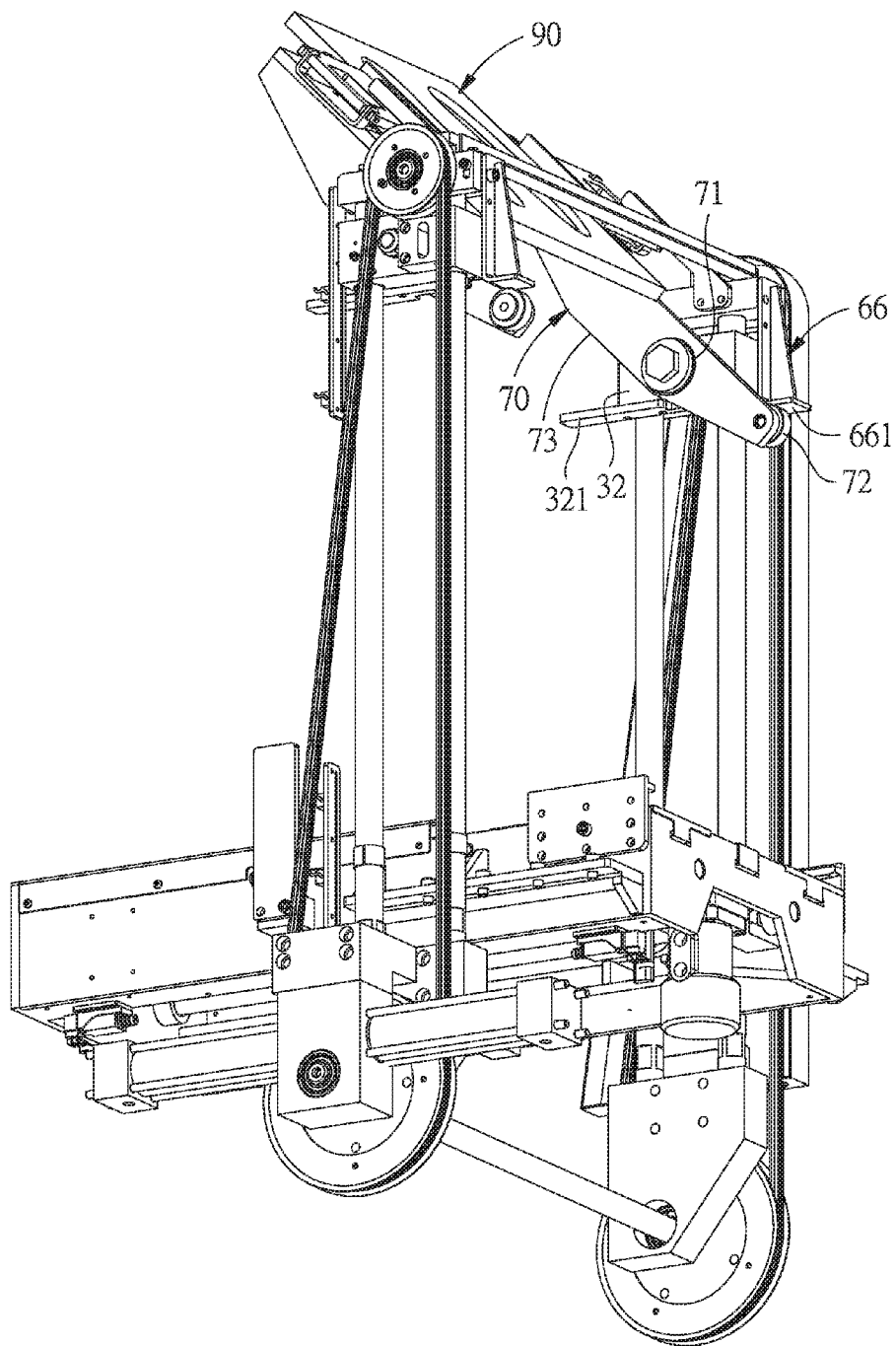
FIG. 9 is another operational view of the present invention showing the rotation of the middle mould.

It should be noted that, as shown in FIGS. 2, 3 and 8, the present invention further comprises two restricting rods 33 which are disposed at the top portions 311 of the longitudinal guide assemblies 30, and are located corresponding to the covers 80 within the scope of the pivot arms 70. When the pivot arms 70 rotate by an angle and the covers 80 rotate along with the pivot arms 70, the restricting rods 33 will stop the covers 80, so as to prevent inertia from causing disengagement of the covers 80 from the restricting grooves 74, which consequently prevents disengage of the middle mould 90 from the restricting grooves 74 if the middle mould 90 rotate too fast.

While we have shown and described various embodiments in accordance with the present invention, it is clear to those skilled in the art that further embodiments may be made without departing from the scope of the present invention.

What is claimed is:

1. A mould lifting device suitable for use in lifting and rotating a middle mould, two pivot portions being provided at two lateral surfaces of the middle mould, the mould lifting device comprising:

a platform with a top surface;

two longitudinal guide assemblies disposed at two sides of the platform, and each including: a longitudinal guide unit which includes a top portion, a bottom portion located a longitudinal distance away from the top portion, and a guide portion connected between the top portion and the bottom portion, and a longitudinal slide carriage which is movably disposed on the guide portion and includes a push portion;

two transmissions for driving the longitudinal slide carriages to move;

a power assembly for driving the transmissions to move;

two lifting members disposed at both sides of the platform, and each including a lifting portion which is higher than the top surface of the platform;

two push members fixed at the top portions of the longitudinal guide assemblies, and each including a push portion located between the top portion and the bottom portion of a corresponding one of the longitudinal guide assemblies;

two pivot arms each including: a pivot connecting portion pivoted to a corresponding one of the longitudinal slide carriages, a pivot push portion which is located at one side of the pivot connecting portion to move away from or push against the push portion of a corresponding one of the push members, an abutting surface which is located at another side of the pivot connecting portion to push against or move away from a corresponding one of the push portions, and two restricting grooves which are located at another side of the pivot connecting portion and each include an opening which opens towards the top portion to restrict a corresponding one of the pivot portions of the middle mould, when the pivot push portion moves away from the push portion of the push members, the abutting surface will push against the push portion of the longitudinal slide carriages to lift the middle mould where the pivot portions are restricted in the restricting grooves, when the pivot push portion pushes against the push portion of the push members, the abutting surface will move away from the push portion of the longitudinal slide carriages to rotate the middle mould where the pivot portions are restricted in the restricting grooves;

two covers disposed on the two pivot arms, and each including: a cover portion for covering the opening of a corresponding one of the restricting grooves, and a lifted portion to be pushed by the lifting portion of a corresponding one of the lifting members, when the lifted portion is pushed by the lifting portion of a corresponding one of the lifting members, the concerned cover will pivot by an angle to move the cover portion away from the opening of the corresponding one of the restricting grooves, when the lifted portion is moved away from the lifting portion of the corresponding one of the lifting members, the concerned cover will pivot an angle to make the cover portion cover the opening of the corresponding one of the restricting grooves.

2. The mould lifting device as claimed in claim 1, wherein each of the push portions is fixed on an inner surface of a corresponding one of the longitudinal slide carriages.

3. The mould lifting device as claimed in claim 1, wherein each of the two transmissions includes: a first transmission wheel disposed on the top portion, a second transmission wheel disposed on the bottom portion, and a transmission belt which is wound around the first and second transmission wheels, the transmission belt includes a fixing section for fixing a corresponding one of the longitudinal slide carriages, the power assembly includes: a power connecting rod which is drivingly connected between the two second transmission wheels and includes a power connecting portion, and a power unit which is drivingly connected to the power connecting portion to drive the power connecting rod to rotate.

4. The mould lifting device as claimed in claim 1, wherein the two guide portions are two parallel longitudinal guide rods.

5. The mould lifting device as claimed in claim 3, wherein the power connecting portion of the power connecting rod is a toothed wheel, the power unit includes a housing, and a piston which is movably disposed in the housing and includes a toothed bar to be drivingly engaged with the power connecting portion.

6. The mould lifting device as claimed in claim 1, wherein the pivot push portion of each of the pivot arms is a pulley.

7. The mould lifting device as claimed in claim 1, wherein each of the restricting grooves is defined by two opposite restricting blocks fixed on each of the pivot arms.

8. The mould lifting device as claimed in claim 1 further comprising two restricting rods which are disposed at the top portions of the longitudinal guide assemblies, and located corresponding to the covers within the scope of the pivot arms.

9. The mould lifting device as claimed in claim 1, wherein each of the pivot arms includes a through hole for insertion of the lifting portion of each of the lifting members.

* * * * *